United States Patent
Angelopoulos et al.

(10) Patent No.: US 10,504,137 B1
(45) Date of Patent: Dec. 10, 2019

(54) SYSTEM, METHOD, AND COMPUTER PROGRAM PRODUCT FOR MONITORING AND RESPONDING TO THE PERFORMANCE OF AN AD

(71) Applicant: Persado Intellectual Property Limited, London (GB)

(72) Inventors: Panagiotis Angelopoulos, Long Island City, NY (US); Assaf Baciu, Brooklyn, NY (US)

(73) Assignee: PERSADO INTELLECTUAL PROPERTY LIMITED, London (GB)

(*) Notice: Subject to any disclaimer, the term of this patent is extended or adjusted under 35 U.S.C. 154(b) by 908 days.

(21) Appl. No.: 14/879,042

(22) Filed: Oct. 8, 2015

(51) Int. Cl.
G06Q 30/02 (2012.01)

(52) U.S. Cl.
CPC .............. *G06Q 30/0244* (2013.01)

(58) Field of Classification Search
CPC ............................................. G06Q 30/0244
USPC ....................................... 705/14.43
See application file for complete search history.

(56) References Cited

U.S. PATENT DOCUMENTS

| | | | |
|---|---|---|---|
| 4,930,077 A | 5/1990 | Fan | |
| 5,173,854 A | 12/1992 | Kaufman et al. | |
| 5,652,828 A | 7/1997 | Silverman | |
| 6,278,967 B1 | 8/2001 | Akers et al. | |
| 6,400,996 B1 | 6/2002 | Hoffberg et al. | |
| 6,470,306 B1 | 10/2002 | Pringle et al. | |
| 6,647,383 B1 | 11/2003 | August et al. | |
| 6,687,404 B1 | 2/2004 | Hull et al. | |
| 6,760,695 B1 | 7/2004 | Kuno et al. | |
| 6,934,748 B1 | 8/2005 | Louviere et al. | |
| 6,978,239 B2 | 12/2005 | Chu et al. | |
| 7,006,881 B1 | 2/2006 | Hoffberg et al. | |
| 7,013,427 B2 | 3/2006 | Griffith | |
| 7,130,808 B1 | 10/2006 | Ranka et al. | |
| 7,133,834 B1 | 11/2006 | Abelow | |
| 7,137,126 B1 | 11/2006 | Coffman et al. | |
| 7,167,825 B1 | 1/2007 | Potter | |
| 7,181,438 B1 | 2/2007 | Szabo | |

(Continued)

FOREIGN PATENT DOCUMENTS

| | | | |
|---|---|---|---|
| CN | 201466812 U | * | 5/2010 |
| WO | 2001048666 | | 7/2001 |
| WO | 2011076318 | | 6/2011 |

OTHER PUBLICATIONS

Wes Nichols, Advertising Analytics 2.0, 2013 (Year: 2013).*

(Continued)

*Primary Examiner* — Tarek Elchanti
(74) *Attorney, Agent, or Firm* — Lessani Law Group, PC (57) ABSTRACT

The disclosure is directed to a system, method, and computer program product for detecting and responding to changes in the performance of an ad. In a first phase, an expected performance value for an ad is calculated. In a second phase, the performance of the ad is monitored in intervals, wherein for each interval, the response rate of the ad during the interval is calculated and compared to the expected performance value, an upper performance limit, and a lower performance limit. The ad is replaced or the expected performance value is recalculated, depending on how the response rate compares to the expected performance value, the upper performance limit, and the lower performance limit.

18 Claims, 10 Drawing Sheets

(56) References Cited

U.S. PATENT DOCUMENTS

| | | |
|---|---|---|
| 7,302,383 B2 | 11/2007 | Valles |
| 7,363,214 B2 | 4/2008 | Musgrove et al. |
| 7,406,434 B1 | 7/2008 | Chang et al. |
| 7,493,250 B2 | 2/2009 | Hecht et al. |
| 7,769,623 B2 | 8/2010 | Mittal et al. |
| 7,797,699 B2 | 9/2010 | Kagi et al. |
| 7,945,573 B1 | 5/2011 | Barnes et al. |
| 8,260,663 B1 | 9/2012 | Ranka et al. |
| 8,689,253 B2 | 4/2014 | Hallberg et al. |
| 8,762,496 B1 | 6/2014 | Kiveris |
| 9,268,769 B1 | 2/2016 | Shalit et al. |
| 9,741,043 B2 | 8/2017 | Vratskides et al. |
| 10,269,028 B2 | 4/2019 | Vratskides et al. |
| 2002/0156688 A1 | 10/2002 | Horn |
| 2002/0174144 A1 | 11/2002 | Wolpe |
| 2005/0027507 A1 | 2/2005 | Patrudu |
| 2005/0039116 A1 | 2/2005 | Slack-Smith |
| 2005/0060643 A1 | 3/2005 | Glass et al. |
| 2005/0076003 A1 | 4/2005 | DuBose et al. |
| 2005/0234850 A1 | 10/2005 | Buchheit et al. |
| 2006/0155567 A1 | 7/2006 | Walker et al. |
| 2006/0212524 A1 | 9/2006 | Wu et al. |
| 2006/0259360 A1 | 11/2006 | Flinn et al. |
| 2007/0033002 A1 | 2/2007 | Dymetman |
| 2007/0055931 A1 | 3/2007 | Zaima et al. |
| 2007/0127688 A1 | 6/2007 | Doulton |
| 2007/0153989 A1 | 7/2007 | Howell et al. |
| 2007/0168863 A1 | 7/2007 | Blattner et al. |
| 2007/0233566 A1 | 10/2007 | Zlotin et al. |
| 2007/0239444 A1 | 10/2007 | Ma |
| 2007/0260740 A1 | 11/2007 | Guan |
| 2007/0281286 A1 | 12/2007 | Palacios |
| 2008/0059149 A1 | 3/2008 | Martin |
| 2008/0109285 A1 | 5/2008 | Reuther et al. |
| 2008/0178073 A1 | 7/2008 | Gao et al. |
| 2008/0281627 A1 | 11/2008 | Chang et al. |
| 2008/0300857 A1 | 12/2008 | Barbaiani et al. |
| 2008/0313259 A1 | 12/2008 | Correa |
| 2009/0110268 A1 | 4/2009 | Dejean et al. |
| 2009/0150400 A1 | 6/2009 | Abu-Hakima et al. |
| 2009/0177750 A1 | 7/2009 | Lee et al. |
| 2009/0210899 A1 | 8/2009 | Lawrence-Apfelbaum et al. |
| 2009/0226098 A1 | 9/2009 | Takahashi et al. |
| 2009/0254836 A1 | 10/2009 | Bajrach |
| 2009/0276419 A1 | 11/2009 | Jones et al. |
| 2009/0313026 A1 | 12/2009 | Coffman et al. |
| 2010/0100817 A1 | 4/2010 | Trotter |
| 2010/0241418 A1 | 9/2010 | Maeda et al. |
| 2010/0312769 A1 | 12/2010 | Bailey et al. |
| 2010/0312840 A1 | 12/2010 | Chestnut et al. |
| 2011/0040611 A1 | 2/2011 | Simmons et al. |
| 2012/0005041 A1 | 1/2012 | Mehta et al. |
| 2012/0016661 A1 | 1/2012 | Pinkas |
| 2012/0095831 A1 | 4/2012 | Aaltonen et al. |
| 2012/0166345 A1 | 6/2012 | Klemm |
| 2012/0259620 A1 | 10/2012 | Vratskides et al. |
| 2013/0110617 A1 | 5/2013 | Phan et al. |
| 2013/0311269 A1 | 11/2013 | Forte et al. |
| 2013/0346870 A1 | 12/2013 | Greenzeiger et al. |
| 2014/0104370 A1 | 4/2014 | Calman et al. |
| 2017/0316430 A1 | 11/2017 | Vratskides et al. |

OTHER PUBLICATIONS

"Drop-Down list", Dec. 21, 2008.

Hill Associates, "Weighted and Round Robin Queuing", Jul. 14, 2007.

Katevenis, M., et al., "Weighted Round-Robin Cell Multiplexing in a General-Purpose ATM Switch Chip", Oct. 1991, IEEE Journal on Selected Areas in Communication, vol. 9, No. 8.

Lee, Jinkyu, et al., "Multiprocessor Real-Time Scheduling Considering Concurrency and Urgency", Special Issue of the Work-in-Progress (WIP) Session at the 2009 IEEE Real-Time Systems Symposium, Washington, D.C., Dec. 1-4, 2009.

Sawyer, Alan G., "Statistical Power and Effect Size in Consumer Research", in NA—Advances in Consumer Research vol. 09, eds, 1982, pp. 1-7.

"Slider (Computing)", Sep. 27, 2007.

Wikipedia "Barrier (computer science)", Sep. 26, 2010.

Wikipedia "Multi-Variate Testing", Sep. 17, 2010.

* cited by examiner

| Period | SENT | RESPONDED | RR% | UCL | LCL | AV.RR% |
|---|---|---|---|---|---|---|
| 1 | 11077 | 160 | 1.44% | 1.38% | 0.79% | 1.09% |
| 2 | 12589 | 166 | 1.32% | 1.36% | 0.81% | 1.09% |
| 3 | 12747 | 135 | 1.06% | 1.36% | 0.81% | 1.09% |
| 4 | 10184 | 93 | 0.91% | 1.39% | 0.78% | 1.09% |
| 5 | 10895 | 130 | 1.19% | 1.38% | 0.79% | 1.09% |
| 6 | 11976 | 129 | 1.08% | 1.37% | 0.80% | 1.09% |
| 7 | 10184 | 102 | 1.01% | 1.39% | 0.78% | 1.09% |
| 8 | 10151 | 123 | 1.21% | 1.39% | 0.78% | 1.09% |
| 9 | 10869 | 93 | 0.85% | 1.38% | 0.79% | 1.09% |
| 10 | 11377 | 139 | 1.23% | 1.38% | 0.79% | 1.09% |
| 11 | 12206 | 131 | 1.07% | 1.37% | 0.80% | 1.09% |
| 12 | 12642 | 127 | 1.00% | 1.36% | 0.81% | 1.09% |
| 13 | 11462 | 127 | 1.10% | 1.38% | 0.80% | 1.09% |
| 14 | 11377 | 107 | 0.94% | 1.38% | 0.79% | 1.09% |
| 15 | 12119 | 120 | 0.99% | 1.37% | 0.80% | 1.09% |
| 16 | 12888 | 148 | 1.15% | 1.36% | 0.81% | 1.09% |
| 17 | 11952 | 101 | 0.85% | 1.37% | 0.80% | 1.09% |
| 18 | 10424 | 135 | 1.30% | 1.39% | 0.78% | 1.09% |
| 19 | 10640 | 111 | 1.04% | 1.39% | 0.78% | 1.09% |
| 20 | 12394 | 121 | 0.98% | 1.36% | 0.81% | 1.09% |

Incubation Period

| Period (305) | SENT (310) | RESPONDED (320) | RR% (330) | UPL (340) | LPL (350) | AV.RR% (360) |
|---|---|---|---|---|---|---|
| 2 | 12589 | 166 | 1.32% | 1.34% | 0.79% | 1.07% |
| 3 | 12747 | 135 | 1.06% | 1.34% | 0.79% | 1.07% |
| 4 | 10184 | 93 | 0.91% | 1.37% | 0.76% | 1.07% |
| 5 | 10895 | 130 | 1.19% | 1.36% | 0.77% | 1.07% |
| 6 | 11976 | 129 | 1.08% | 1.35% | 0.79% | 1.07% |
| 7 | 10184 | 102 | 1.01% | 1.37% | 0.76% | 1.07% |
| 8 | 10151 | 123 | 1.21% | 1.37% | 0.76% | 1.07% |
| 9 | 10869 | 93 | 0.85% | 1.36% | 0.77% | 1.07% |
| 10 | 11377 | 139 | 1.23% | 1.36% | 0.78% | 1.07% |
| 11 | 12206 | 131 | 1.07% | 1.35% | 0.79% | 1.07% |
| 12 | 12642 | 127 | 1.00% | 1.34% | 0.79% | 1.07% |
| 13 | 11462 | 127 | 1.10% | 1.36% | 0.78% | 1.07% |
| 14 | 11377 | 107 | 0.94% | 1.36% | 0.78% | 1.07% |
| 15 | 12119 | 120 | 0.99% | 1.35% | 0.79% | 1.07% |
| 16 | 12888 | 148 | 1.15% | 1.34% | 0.80% | 1.07% |
| 17 | 11952 | 101 | 0.85% | 1.35% | 0.79% | 1.07% |
| 18 | 10424 | 135 | 1.30% | 1.37% | 0.77% | 1.07% |
| 19 | 10640 | 111 | 1.04% | 1.37% | 0.77% | 1.07% |
| 20 | 12394 | 121 | 0.98% | 1.34% | 0.79% | 1.07% |

Incubation Period

SYSTEM, METHOD, AND COMPUTER PROGRAM PRODUCT FOR MONITORING AND RESPONDING TO THE PERFORMANCE OF AN AD

BACKGROUND OF THE INVENTION

1. Field of the Invention

This invention relates generally to ad delivery systems and, more particularly, to monitoring and responding to the performance of an ad.

2. Description of the Background Art

With the rise of the Internet, computers, and mobile devices, advertising has become more important to many companies. Therefore, there is a desire to maximize the effectiveness of an ad space. There are known methods for analyzing an ad after the fact and using the data to optimize future ads. However, there is a need for a method to monitor an ad in substantially real time and respond to changes in performance of the ad as it is being used in an ad space.

SUMMARY OF THE DISCLOSURE

The present disclosure is directed to a system, method, and computer program product for detecting and responding to changes in the performance of an ad. In a first phase, a computer system in an ad delivery network determines an expected performance value for an ad based on the response rate for the ad during the first phase. In a second phase, the system monitors the performance of the ad in intervals, wherein for each interval, the response rate of the ad during the interval is calculated and compared to the expected performance value, an upper performance limit, and a lower performance limit. The upper and lower performance limits are a function of the expected performance value. In certain embodiments, the upper and lower performance limits are also a function of the number of impressions of the ad delivered in the interval. The first and second phases take place while impressions of the ad are delivered to people. In other words, the ad is monitored while being used in an ad space/slot.

In response to the response rate for the ad either (i) falling below the lower performance limit for a first select number of intervals in the second phase (e.g., 3 consecutive intervals) or (ii) falling below the expected performance value for a second select number of intervals in the second phase (e.g., 5 consecutive intervals), the ad is replaced with a new ad.

In response to the response rate of the ad (i) rising above the upper performance limit for a third select number of intervals in the second phase (e.g., 3 consecutive intervals) or (ii) rising above the expected performance value for a fourth select number of intervals in the second phase (e.g., 5 consecutive intervals), the system calculates a new expected performance value for the ad and uses the new expected performance value in calculating the upper and lower performance limits for subsequent intervals in the second phase.

In certain embodiments, the intervals are predefined time intervals.

In certain embodiments, the system calculates the expected performance value by calculating the ad response rate for predefined intervals in the first initialization phase. The system then calculates upper and lower performance limits for each of the predefined intervals in the first initialization phase. The system identifies any predefined interval in which either the response rate exceeds the upper performance limit for the interval or falls below the lower performance limit for the predefined interval. A total response rate is calculated for the first phase, wherein data from identified intervals, if any, are excluded from the calculation. The system sets the expected performance value to the calculated total response rate.

In certain embodiments, if the ad is replaced with a new ad, the system monitors the new ad beginning in the second phase, using the expected performance value also used for the replaced ad. In other embodiments, the system monitors the new ad beginning in the first phase.

DETAILED DESCRIPTION OF THE PREFERRED EMBODIMENTS

The present disclosure relates to a system, method, and computer program for detecting and responding to changes in the performance of an advertisement ("ad") in a medium where response to the ad can be measured. In one embodiment, the methods described herein are performed by an ad delivery system or other computer system(s) within an ad delivery network ("system" herein may refer to either case).

Figure 1:
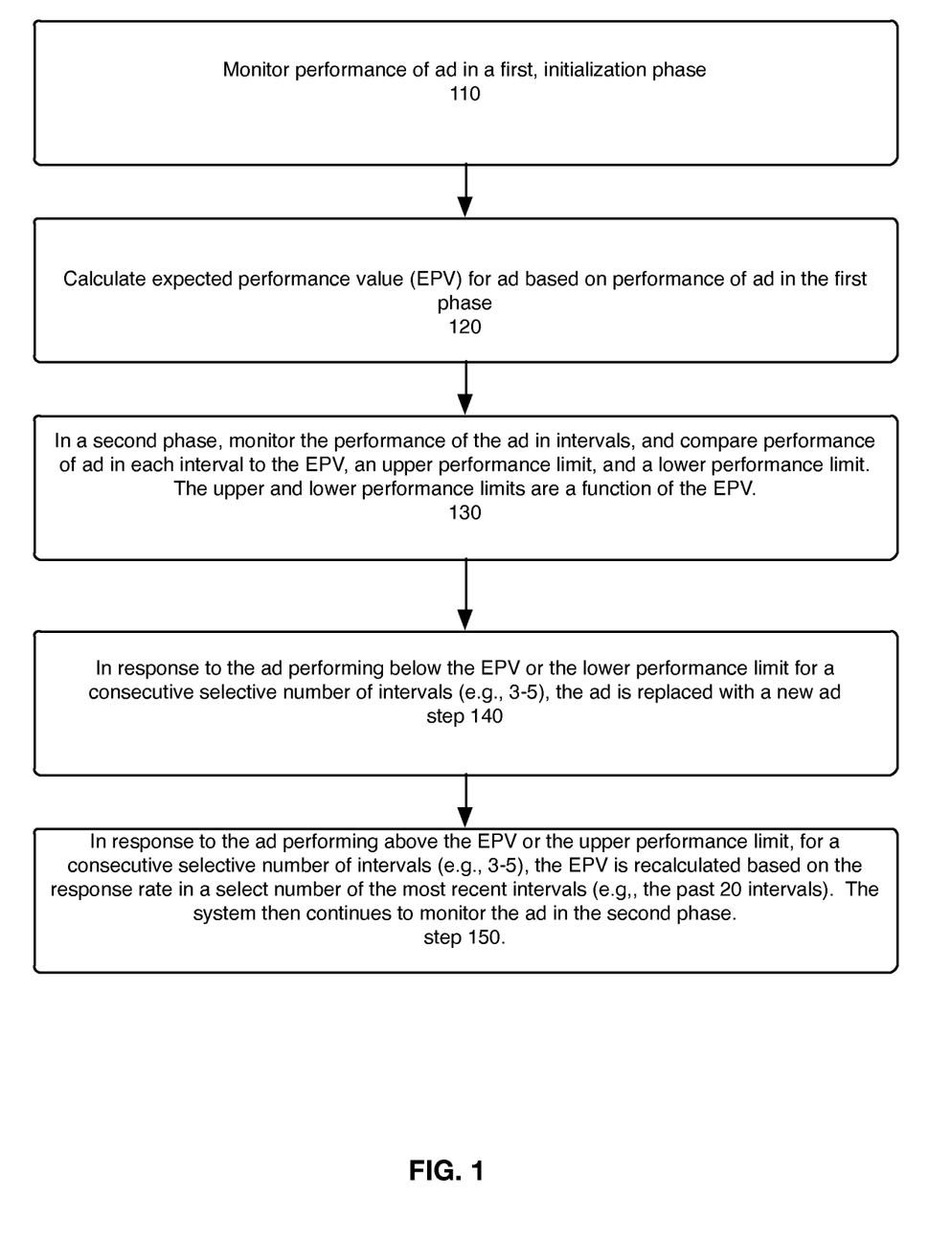
FIG. 1 is a flowchart that illustrates a method, according to one embodiment of the disclosure, for detecting and responding to changes in the performance of an ad.

FIG. 1 illustrates a method for detecting and responding to changes in the performance of an ad. In a first, initialization phase, the system monitors the performance of the ad, and based on such performance, calculates an expected performance value for the ad (steps 110, 120). When the first phase ends, the system enters a second phase in which the system monitors message performance in intervals (e.g., minutes, hours, days, etc.). The monitoring takes place during the time in which the ad is being distributed to people. In both phases, message performance is measured by the response rate to the message, which is the number of people who responded to the ad over the number of impressions (i.e., instances of the ad) delivered to people in the relevant interval, represented as follows:

$$\text{Response Rate} = \frac{\#\text{Responders}}{\#\text{Impressions}}$$

In the second phase, the response rate in each interval is compared to the expected performance value, as well as upper and lower performance limits, which are a function of the expected performance value and the number of impressions delivered in the interval (step 130). If an ad is performing below the expected performance value or the lower performance limit for a consecutive select number of intervals (e.g., 3-5), the ad is replaced with a new ad (step 140). If ad is performing above the expected performance value or the upper performance limit for a consecutive select number of intervals (e.g., 3-5), the expected performance value is recalculated based on the response rate in a select number of the most recent intervals (e.g., the past 20 intervals) (step 150).

Figure 2A:
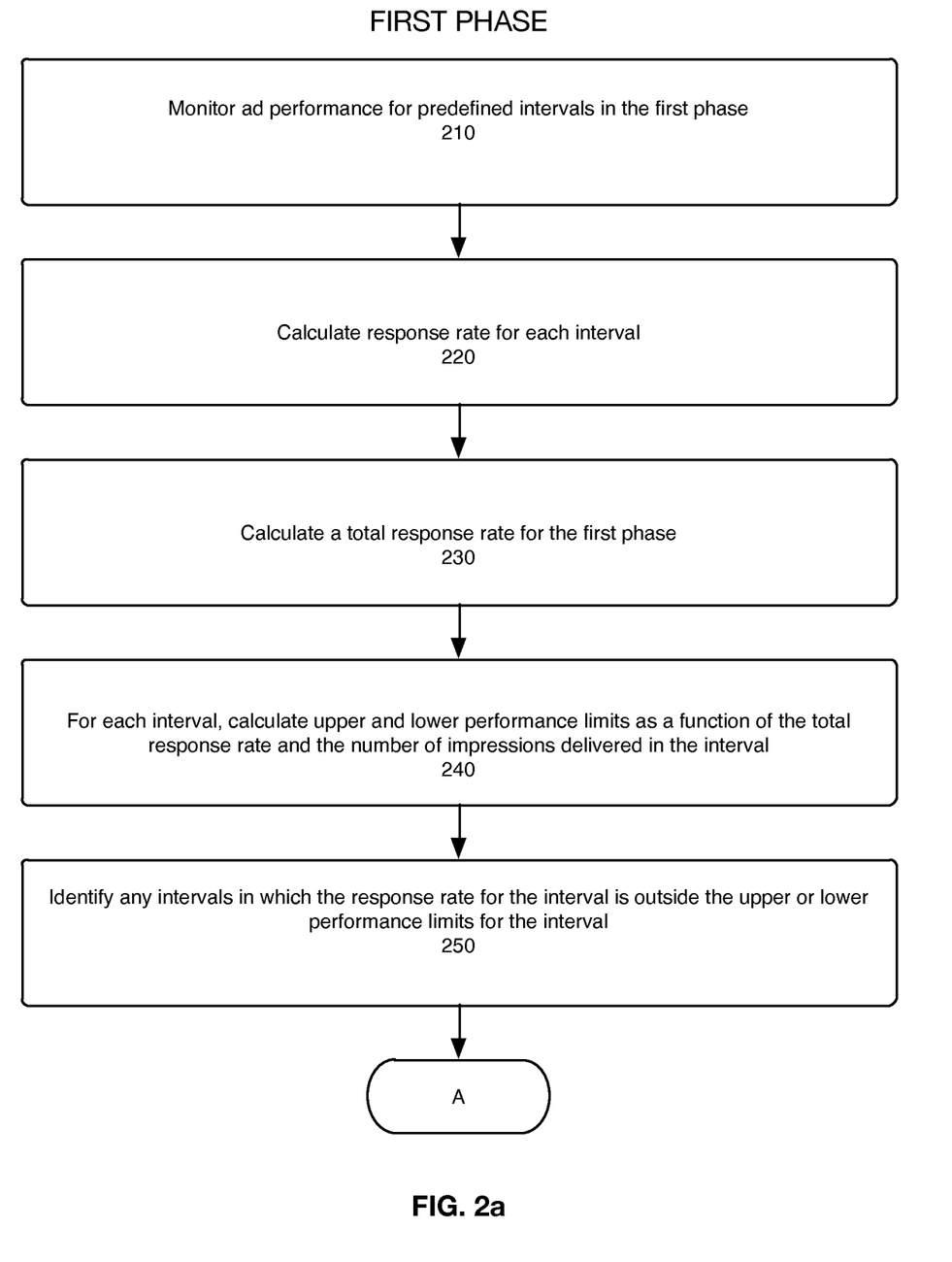
FIGS. 2*a-b* are a flowchart that illustrates an example method for calculating the expected performance value in the first phase.
Figure 2B:
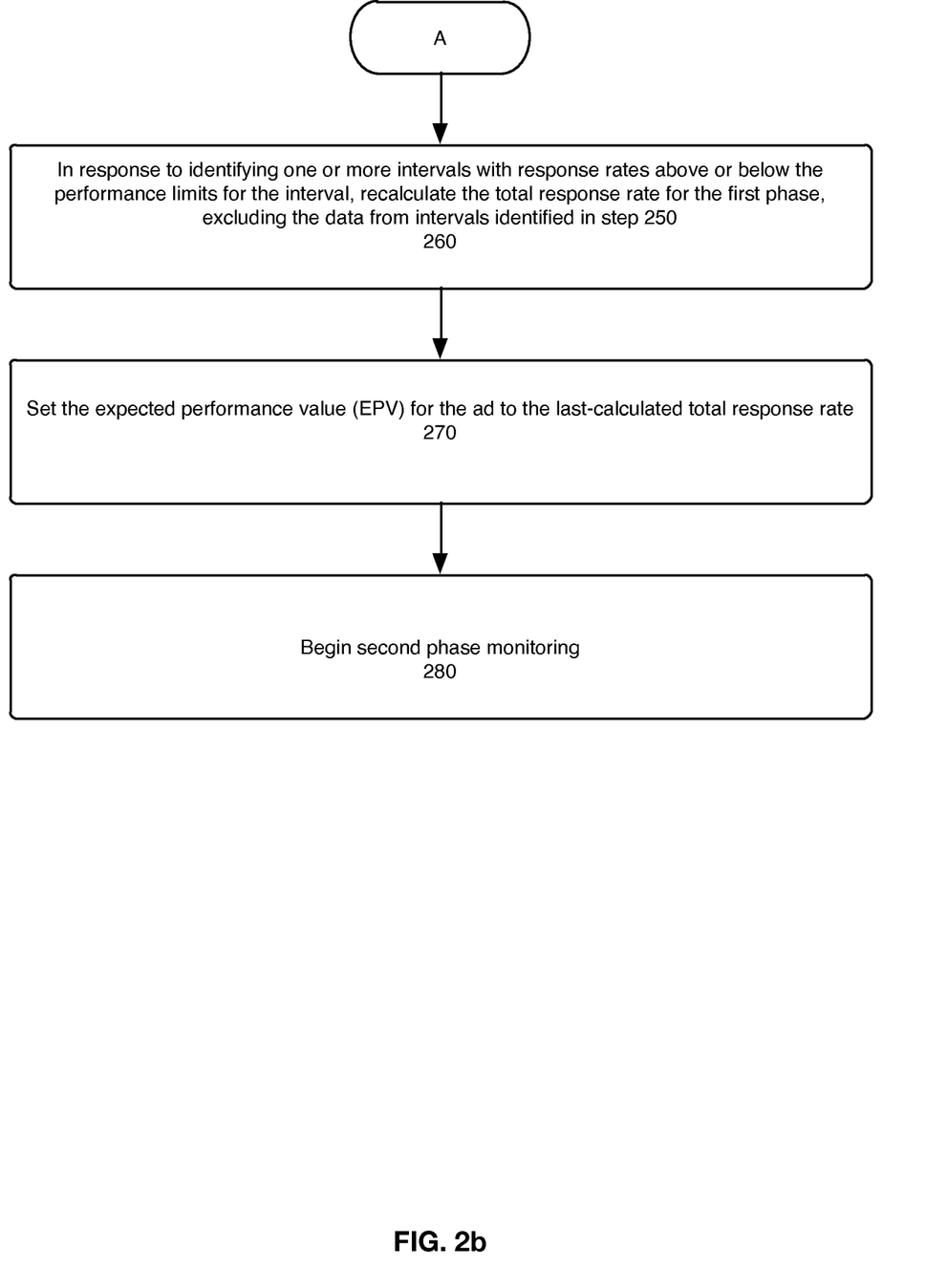

FIGS. 2*a*-*b* illustrate an example method for calculating the expected performance value (EPV) in the first phase. The system monitors ad performance (i.e., response rate) for predefined intervals in the first phase (step 210). In one embodiment, the first phase is 20 intervals longs, such as the first 20 intervals in which ad impressions are delivered. The system calculates a response rate for each interval (step 220). The response rate for each interval (RRi) is measured as responders (RES) in interval i over ad impressions n delivered in interval i, as shown in the below equation:

$$RR_i = \frac{RES_i}{n_i}$$

After the end of the last interval in the first phase, the system the calculates a total response rate (RR) for the first phase (step 230), which is measured as the total responders for the first phase over the total ad impressions in the first phase, as shown in the below equation:

$$RR = \frac{\sum_i RES_i}{\sum_i n_i}$$

For each interval, the system calculates upper and lower performance limits as a function of the total response rate (RR) and the number of impressions of the ad delivered in the interval i (step 240). For example, in one embodiment the upper performance limit (UPL) and lower performance limit (LPL) calculated as follows:

$$UPL_i = RR + 3\sqrt{\frac{RR*(1-RR)}{n_i}}$$

$$LPL_i = RR - 3\sqrt{\frac{RR*(1-RR)}{n_i}}$$

The system identifies any intervals in which the response rate for the interval (RR$_i$) is outside the upper or lower performance limit for the interval (step 250). If there are intervals with response rates above or below the performance limits, the system recalculates the total response rate (RR) for the first phase, excluding the data from the intervals identified in step 250 (step 260). The system then sets the expected performance value (EPV) for the ad to the last-calculated total response rate in the first phase (step 270), as shown in the below equation:

EPV=RR.

Once the first phase is complete, the system monitors ad performance in the second phase (step 280), which is described below with respect to FIGS. 7*a*-7*b*.

Figure 3:
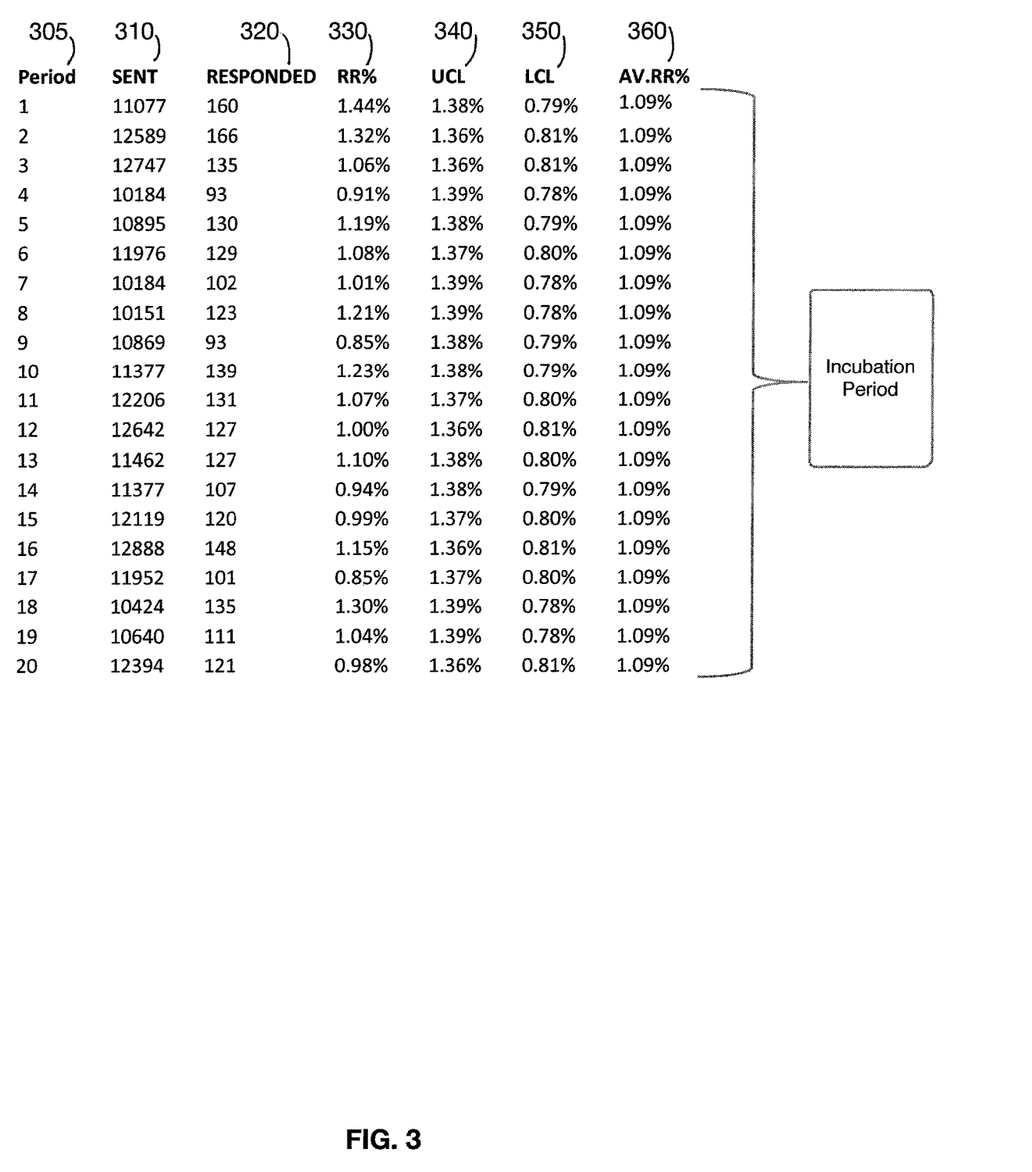
FIG. 3 is a table that illustrates example data for a first phase.

FIG. 3 illustrates example data for a first phase that includes 20 intervals (or periods). Column 305 lists the intervals, column 310 displays the total ad impressions delivered in each interval, and column 320 displays the number of people who responded to the ad in the interval. Column 330 lists the calculated response rate (in percentage form) for each interval (RRi), and column 360 lists the total response rate (in percentage form) for the first phase (i.e., the response rate for the first 20 intervals). Columns 340 and 350 display the upper and lower performance limits for each interval, which are calculated based on the total response rate in accordance with the equations listed above.

Figure 4:
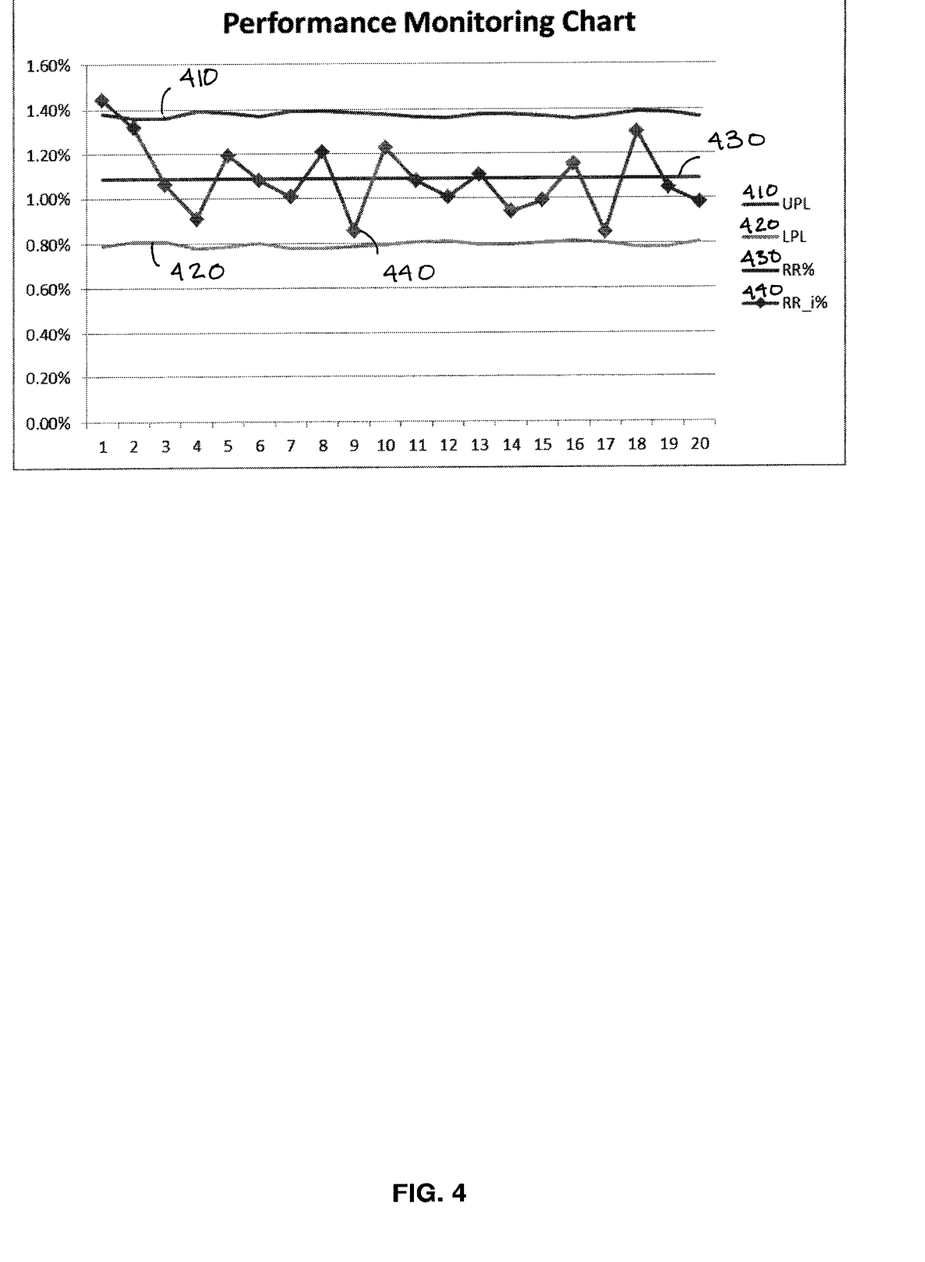
FIG. 4 is a graph in which data from FIG. 3 are plotted.
Figure 5:
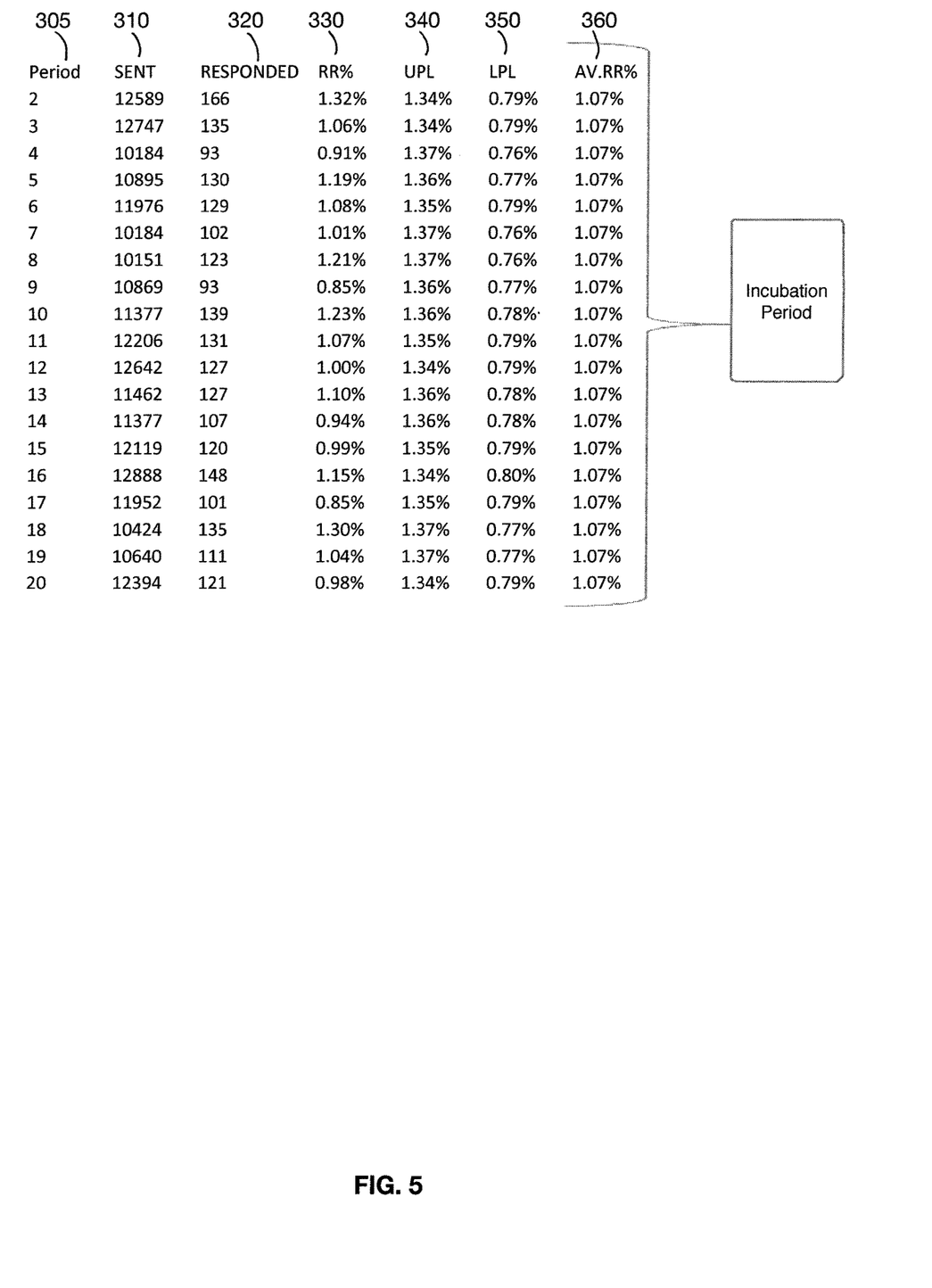
FIG. 5 is a table that illustrates example data for a first phase.
Figure 6:
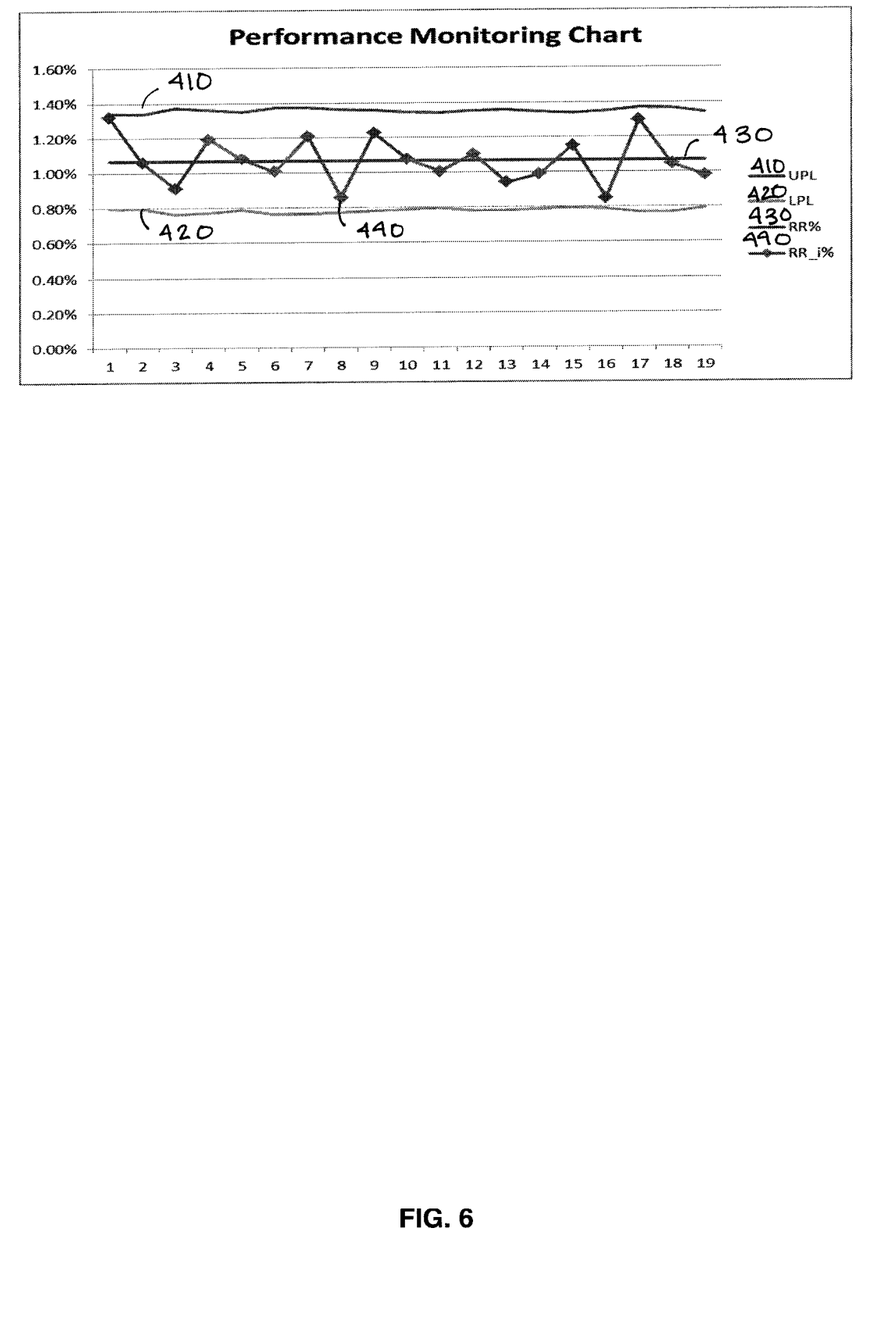
FIG. 6 is a graph in which data from FIG. 5 are plotted.

FIG. 4 is a chart in which the RR$_i$ 440, UCL 410, LCL 420, and RR 430 are plotted for each of the intervals. The chart illustrates that the RR$_i$ for the first interval (Period 1) exceeds the upper performance limit for the interval. Thus, RR$_i$ for Period 1 is considered an outlier. The total response rate (RR) is recalculated, excluding the data from Period 1. Thus, RR percentage drops from 1.09% to 1.07%. The table in FIG. 5, and the corresponding chart in FIG. 6 illustrate the first phase data with the Period 1 data removed. The reference numbers in FIG. 6 correspond to the same elements in FIG. 4.

Figure 7A:
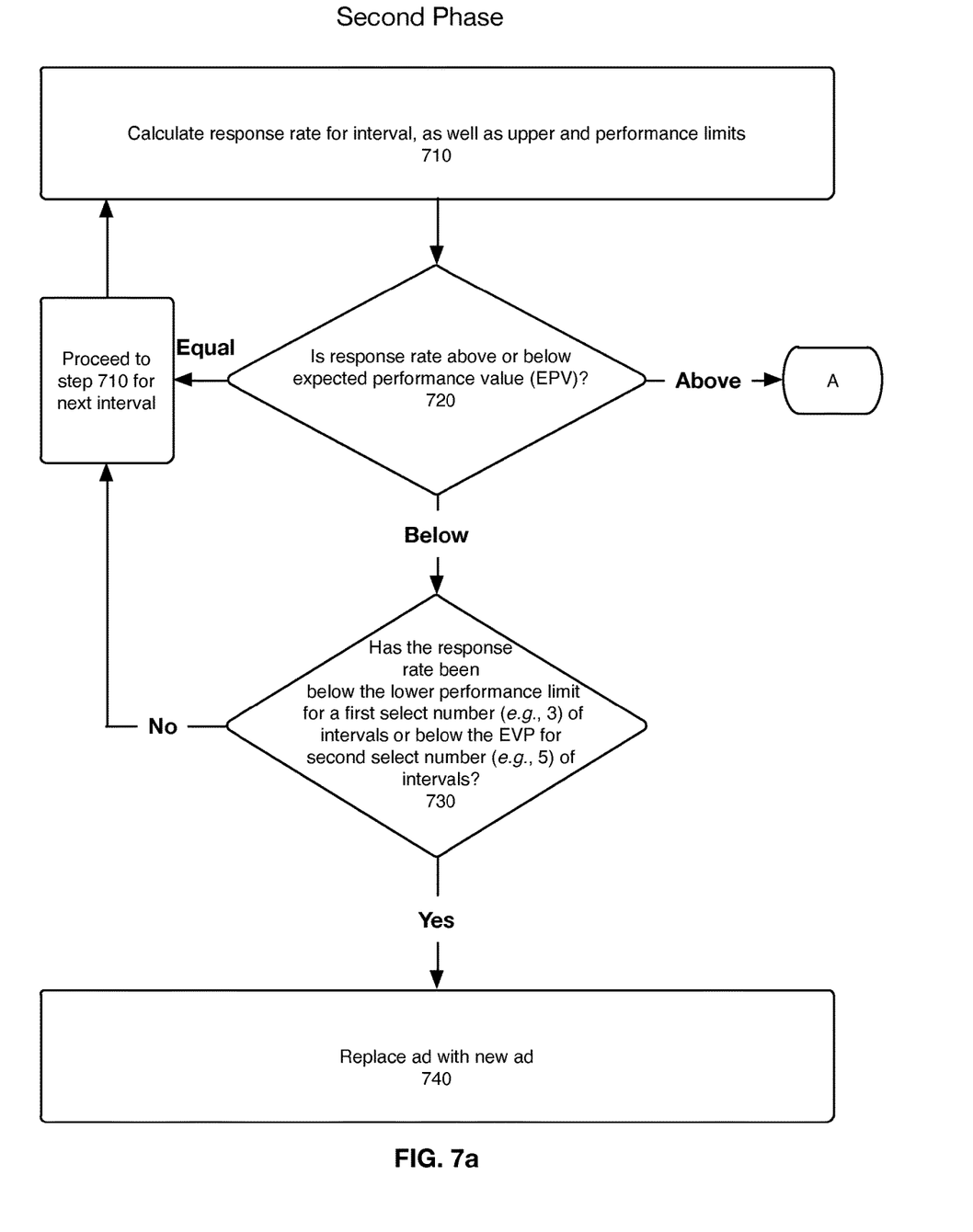
FIGS. 7*a-b* are a flowchart that illustrates an example method for monitoring ad performance in the second phase.
Figure 7B:
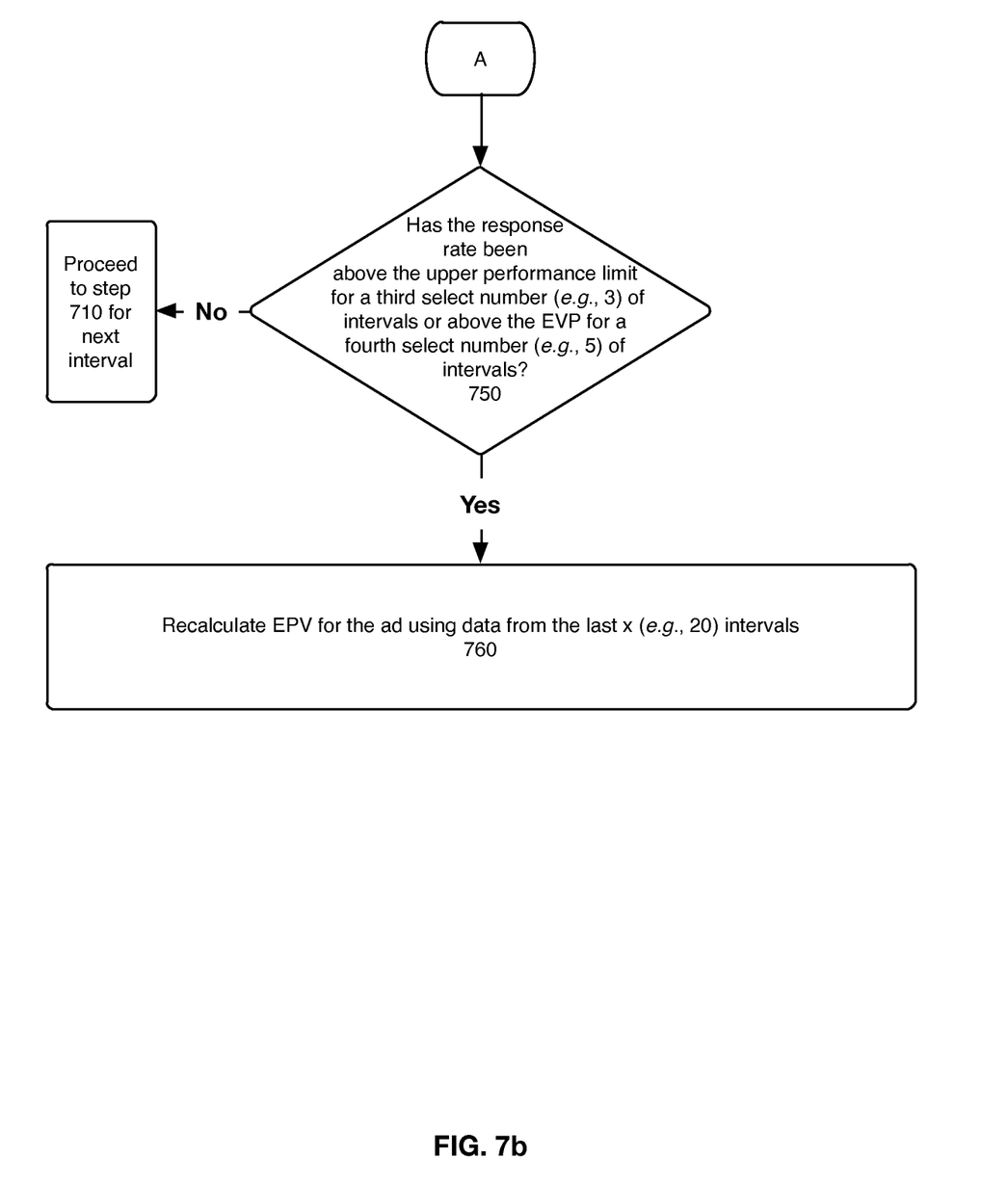

FIGS. 7*a*-*b* illustrate a method for monitoring ad performance in the second phase. In one embodiment, the second phase begins with the first interval after the first phase. As with the first phase, performance is monitored in predefined intervals. The steps of FIGS. 7*a*-*b* are performed in substantially real-time at the end of each interval, as response data for the interval is received. At end of each interval in the second phase, the system calculates the response rate (RR$_i$) for the interval, as well as the upper and lower performance limits for the interval (step 710). In the second phase, the upper and lower performance limits of each interval are a function of the expected performance value (EPV) calculated in the first phase and the number of users, n, to whom the ad was delivered in the interval i. For example, the upper performance limit (UPL) and lower performance limit (LPL) may be calculated as follows:

$$UPL_i = EPV + 3\sqrt{\frac{EPV*(1-EPV)}{n_i}}$$

$$LPL_i = EPV - 3\sqrt{\frac{EPV*(1-EPV)}{n_i}}$$

The system determines if the response rate for the interval is below or above the expected performance value (step 720). If it is below the expected performance value, the system determines if the response rate for the ad has either been (i) below the lower performance limit for a first select number of consecutive intervals (e.g., 3 or more consecutive intervals) or (ii) below the expected performance value for second select number of consecutive intervals (e.g., 5 or more consecutive intervals) (step 730). If so, this indicates that ad performance is degrading, and the system replaces the ad with a new ad (step 740). The first select number is less than the second select number because the falling below the lower performance limit is a more serious degradation than following below only the expected performance value. If step 730 does not evaluate to true, the system does nothing with the ad and returns to step 710 once it receives the data for the next interval (step 745).

If the response rate for the interval is above the expected performance value, the system determines if the response rate for the ad has either been (i) above the upper performance limit for the third select number of consecutive intervals (e.g., 3 or more consecutive intervals) or (ii) above the expected performance value for a fourth select number of consecutive intervals (e.g., 5 or more consecutive intervals) (step 750). If so, this indicates that there is an upward shift in performance due to external factors. Therefore, the system re-calculates the expected performance value for the ad using data from a number (e.g., 20) of the most recent intervals (step 760). In other words, the system repeats the initialization steps illustrated in FIG. 2 with data from x number of recent intervals, where x is any number greater than 2 and preferably around 20. As the upper performance and lower performance limits are dependent on the EPV, raising the EPV will also raise the upper and lower performance limits for subsequent intervals for the ad. If step 750 evaluates to false, then the system does nothing with the ad at this time and proceeds to step 710 once the data for the next interval arrives.

In one embodiment, if the system replaces an ad in step 740, the system starts monitoring the new ad in phase 1, first performing the steps illustrated in FIGS. 2a-b, before moving on to phase 2 monitoring for the ad. In other words, in such embodiment, the system calculates an expected performance value for each new ad. In an alternate embodiment, the system continues monitoring the new ad in the second phase, using the expected performance value from the previous ad. In this sense, the EPV represents the EPV for the ad space. If the new ad continues to perform below the expected performance value for a certain number of consecutive intervals (e.g., 5) immediately after the new ad is distributed, this indicates that there is an overall downward shift for the ad space. In such case, the system calculates a new expected performance value for the ad in accordance with the method of FIGS. 2a-b using data from a number of the most recent intervals (e.g., the twenty most recent intervals) and then continues to monitor and react to the ad performance in accordance with the steps of FIGS. 7a-b. For example, if Ad #1 is replaced by Ad #2, but Ad #2 continues to perform below the EPV (calculated for Ad #1) for a number of consecutive intervals immediately after distribution of Ad #2 (e.g., 5 consecutive intervals), then the system will calculate a new EPV for Ad #2 instead of replacing the ad with Ad #3. Thereafter, the Ad #2 will be monitored, and, if necessary, replaced in accordance with the steps of FIG. 7a-b. Conversely, if Ad #2 initially performs better than the EPV for Ad #1 and then subsequently degrades, it will be replaced with Ad #3 in accordance with steps 730 and 740 in FIG. 7a.

In the above-described embodiments, the upper and lower performance limits are calculated for each interval and are a function of the EPV and the number of impressions delivered in the interval. However, in an alternate embodiment, a single upper performance limit and a single lower performance limit are used for one or both phases. In such case, the upper and lower performance limits are simply a function of the EPV.

In one embodiment, all the intervals are of the same length, but they could vary as long as the EPV values, upper performance limit, and lower limit are a function of the number of impressions delivered in an interval. The intervals may be periods of time (seconds, hours, days, etc.) or may be defined by the number of impressions delivered (e.g., 10,000 impressions long). In other words, the intervals may be time intervals or batch-of-impressions intervals.

Figure 8:
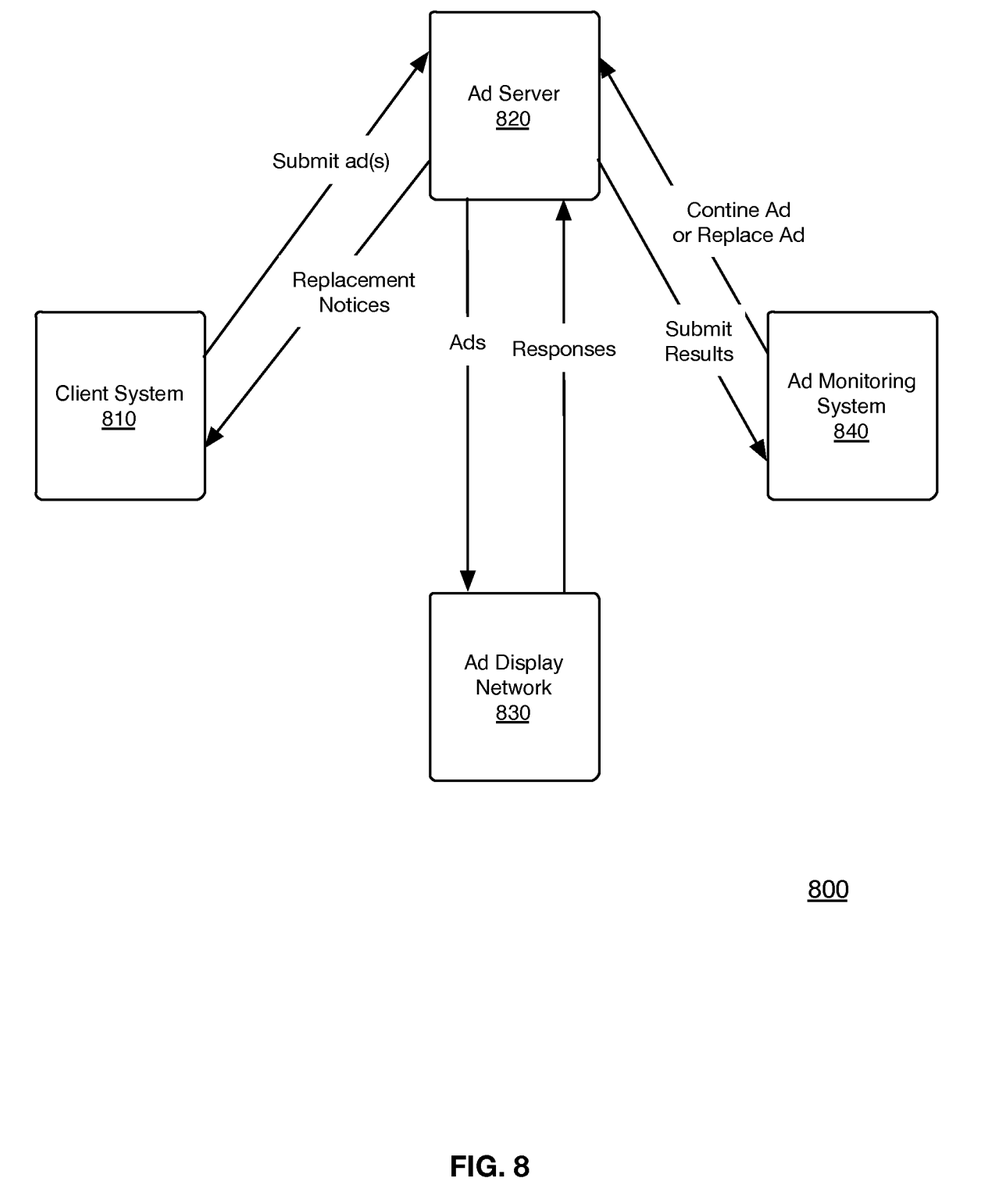
FIG. 8 is block diagram that illustrates an example ad delivery network.

FIG. 8 illustrates an example of an ad delivery network 800. Network 800 includes a client computer system 810, an ad server 820, an ad display network 830, and an ad monitoring system 840. A user (e.g., a client of the ad monitoring system) submits an ad to the ad server 810 via the client computer system 810. The ad server 820 delivers ads to an ad display network 830 and submits results (e.g., number of clicks, phone calls, or other actions) to the ad monitoring system 840. The ad display network 830 comprises devices (e.g., computers, smart phones, tablets, etc.) that display/play advertisements and that gather responses to the ad (like clicks, phone calls, and other actions). The ad monitoring system 840 monitors ad performance and, if necessary, instructs the ad server 820 to replace ads in accordance with the methods described herein. In one embodiment, the ad monitoring system 840 is a computer system executing software that performs the functions described with respect to FIGS. 1-7. If an ad is replaced, the ad server 820 notifies the user via client system 810. FIG. 8 is only an example of an ad delivery network 800, and those skilled in the art will appreciate that the methods described herein are not limited to the network architecture illustrated in FIG. 8.

The methods described herein are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for detecting and responding to changes in the performance of an ad while ad impressions are being distributed, the method comprising:
    monitoring the performance of an ad and calculating a response rate for the ad during a first initialization phase;
    calculating an expected performance value based on the response rate in the first initialization phase, wherein calculating the expected performance value in the first initialization phase comprises:
        calculating the response rate for the ad during predefined intervals in the first initialization phase,
        calculating upper and lower performance limits for each of the predefined intervals in the first initialization phase,
        identifying any predefined interval in which either the response rate exceeds the upper performance limit for the predefined interval or falls below the lower performance limit for the predefined interval,
        calculating a total response rate during the first initialization phase, wherein data from identified intervals, if any, are excluded from the calculation, and
        setting the expected performance value to the calculated total response rate;
    in a second phase, monitoring the performance of the ad in intervals, wherein for each interval, the response rate of the ad during the interval is calculated and compared to the expected performance value and upper performance limit and a lower performance limit in the second phase wherein the upper and lower performance limits in the second phase are a function of the expected performance value calculated in the first phase, and wherein the monitoring of the performance of the ad in the first and second phase takes place in substantially real time while impressions of the ad are being displayed or played in an ad space;

in response to the response rate for the ad either (i) falling below the lower performance limit for a first select number of intervals in the second phase or (ii) falling below the expected performance value for a second select number of intervals in the second phase, replacing the ad with a new ad in substantially real time as the response rate is calculated and compared to the expected performance value and the upper and lower performance limits in the second phase; and in response to the response rate of the ad (i) rising above the upper performance limit for a third select number of intervals in the second phase or (ii) rising above the expected performance value for a fourth select number of intervals in the second phase, calculating a new expected performance value for the ad in substantially real time as the response rate is calculated and compared to the expected performance value and the upper and lower performance limits in the second phase and using the new expected performance value for the ad in calculating the upper and lower performance limits for subsequent intervals in the second phase.

2. The method of claim 1, wherein the upper and lower performance limits for each interval in the second phase are also a function of the number of impressions of the ad delivered in the interval.

3. The method of claim 1, wherein the first and third select numbers are each 3, and the second and fourth select numbers are each 5.

4. The method of claim 1, wherein the intervals are predefined time intervals.

5. The method of claim 1, wherein, in response to the ad being replaced with a new ad, monitoring the new ad beginning in the second phase using the expected performance value used for the replaced ad.

6. The method of claim 1, wherein, in response to the ad being replaced with a new ad, repeating the steps of claim 1 with the new ad.

7. A non-transitory, computer-readable medium comprising a computer program that, when executed by a computer system, enables the computer system to perform the following method for detecting and responding to changes in the performance of an ad, the method comprising:

monitoring the performance of an ad and calculating a response rate for the ad during a first initialization phase;

calculating an expected performance value based on the response rate in the first initialization phase, wherein calculating the expected performance value in the first initialization phase comprises:

calculating the response rate for the ad during predefined intervals in the first initialization phase, calculating upper and lower performance limits for each of the predefined intervals in the first initialization phase, identifying any predefined interval in which either the response rate exceeds the upper performance limit for the predefined interval or falls below the lower performance limit for the predefined interval, calculating a total response rate during the first initialization phase, wherein data from identified intervals, if any, are excluded from the calculation, and setting the expected performance value to the calculated total response rate;

in a second phase, monitoring the performance of the ad in intervals, wherein for each interval, the response rate of the ad during the interval is calculated and compared to the expected performance value and an upper performance limit and a lower performance limit in the second phase, wherein the upper and lower performance limits in the second phase are a function of the expected performance value calculated in the first phase, and wherein the monitoring of the performance of the ad in the first and second phase takes place in substantially real time while impressions of the ad are being displayed or played in an ad space;

in response to the response rate for the ad either (i) falling below the lower performance limit for a first select number of intervals in the second phase or (ii) falling below the expected performance value for a second select number of intervals in the second phase, replacing the ad with a new ad in substantially real time as the response rate is calculated and compared to the expected performance value and the upper and lower performance limits in the second phase; and in response to the response rate of the ad (i) rising above the upper performance limit for a third select number of intervals in the second phase or (ii) rising above the expected performance value for a fourth select number of intervals in the second phase, calculating a new expected performance value for the ad in substantially real time as the response rate is calculated and compared to the expected performance value and the upper and lower performance limits in the second phase and using the new expected performance value for the ad in calculating the upper and lower performance limits for subsequent intervals in the second phase.

8. The non-transitory, computer-readable medium of claim 7, wherein the upper and lower performance limits for each interval in the second phase are also a function of the number of impressions of the ad delivered in the interval.

9. The non-transitory, computer-readable medium of claim 7, wherein the first and third select numbers are each 3, and the second and fourth select numbers are each 5.

10. The non-transitory, computer-readable medium of claim 7, wherein the intervals are predefined time intervals.

11. The non-transitory, computer-readable medium of claim 7, wherein, in response to the ad being replaced with a new ad, monitoring the new ad beginning in the second phase using the expected performance value used for the replaced ad.

12. The non-transitory, computer-readable medium of claim 7, wherein, in response to the ad being replaced with a new ad, repeating the steps of claim 7 with the new ad.

13. A system for detecting and responding to changes in the performance of an ad, the system comprising:

one or more processors;

one or more memory units coupled to the one or more processors, wherein the one or more memory units store instructions that, when executed by the one or more processors, cause the system to perform the operations of:

monitoring the performance of an ad and calculating a response rate for the ad during a first initialization phase;

calculating an expected performance value based on the response rate in the first initialization phase, wherein calculating the expected performance value in the first initialization phase comprises:

calculating the response rate for the ad during predefined intervals in the first initialization phase,     calculating upper and lower performance limits for each of the predefined intervals in the first initialization phase,     identifying any predefined interval in which either the response rate exceeds the upper performance limit for the predefined interval or falls below the lower performance limit for the predefined interval,     calculating a total response rate during the first initialization phase, wherein data from identified intervals, if any, are excluded from the calculation, and     setting the expected performance value to the calculated total response rate;

in a second phase, monitoring the performance of the ad in intervals, wherein for each interval, the response rate of the ad during the interval is calculated and compared to the expected performance value and an upper performance limit and a lower performance limit in the second phase, wherein the upper and lower performance limits in the second phase are a function of the expected performance value calculated in the first phase, and wherein the monitoring of the performance of the ad in the first and second phase takes place in substantially real time while impressions of the ad are being displayed or played in an ad space;

in response to the response rate for the ad either (i) falling below the lower performance limit for a first select number of intervals in the second phase or (ii) falling below the expected performance value for a second select number of intervals in the second phase, replacing the ad with a new ad in substantially real time as the response rate is calculated and compared to the expected performance value and the upper and lower performance limits in the second phase; and in response to the response rate of the ad (i) rising above the upper performance limit for a third select number of intervals in the second phase or (ii) rising above the expected performance value for a fourth select number of intervals in the second phase, calculating a new expected performance value for the ad in substantially real time as the response rate is calculated and compared to the expected performance value and the upper and lower performance limits in the second phase and using the new expected performance value for the ad in calculating the upper and lower performance limits for subsequent intervals in the second phase.

14. The system of claim 13, wherein the upper and lower performance limits for each interval in the second phase are also a function of the number of impressions of the ad delivered in the interval.

15. The system of claim 13, wherein the first and third select numbers are each 3, and the second and fourth select numbers are each 5.

16. The system of claim 13, wherein the intervals are predefined time intervals.

17. The system of claim 13, wherein, in response to the ad being replaced with a new ad, monitoring the new ad beginning in the second phase using the expected performance value used for the replaced ad.

18. The system of claim 13, wherein, in response to the ad being replaced with a new ad, repeating the steps of claim 13 with the new ad.

\* \* \* \* \*